United States Patent [19]
Raley

[11] Patent Number: 4,825,584
[45] Date of Patent: May 2, 1989

[54] MODULAR FISH LURE HOLDER

[76] Inventor: John H. Raley, 9442 Beckett Dr., Windham, Ohio 44288

[21] Appl. No.: 179,967

[22] Filed: Apr. 11, 1988

[51] Int. Cl.⁴ ............................................. A01K 97/06
[52] U.S. Cl. ..................................................... 43/57.1
[58] Field of Search ...................... 43/54.1, 57.1, 57.2, 43/57.3

[56] References Cited

U.S. PATENT DOCUMENTS

| | | | |
|---|---|---|---|
| 3,122,854 | 3/1964 | Boertlein et al. | 43/57.1 |
| 3,747,258 | 7/1973 | Maciel | 43/57.1 |
| 4,198,777 | 4/1980 | Cruzan et al. | 43/57.1 |
| 4,372,073 | 2/1983 | Goldman | 43/57.1 |
| 4,691,469 | 9/1987 | Alsobrook et al. | 43/57.1 |
| 4,703,581 | 11/1987 | Whittier | 43/57.1 |

*Primary Examiner*—M. Jordan
*Attorney, Agent, or Firm*—Oldham & Oldham Co.

[57] ABSTRACT

Modules for use with a fish lure holder comprise a flexible backing sheet, with at least one flexible pocket-containing strip of transparent plastic sheeting, and a flexible transparent plastic protective cover sheet adapted for deployment over the pockets, both of the latter being attached to the backing sheet. The pockets are disposed adjacent to each other, and at right angles to the pocket-containing strip, and are formed by points of attachment of the strip to the backing sheet. Matable fastener components are located along both the top and the bottom of the holder, allowing modules to be connected together when additional pockets are needed, and the holder can be rolled into a cylindrical bundle and tied for storage with tie strips attached to the backing sheet.

6 Claims, 2 Drawing Sheets

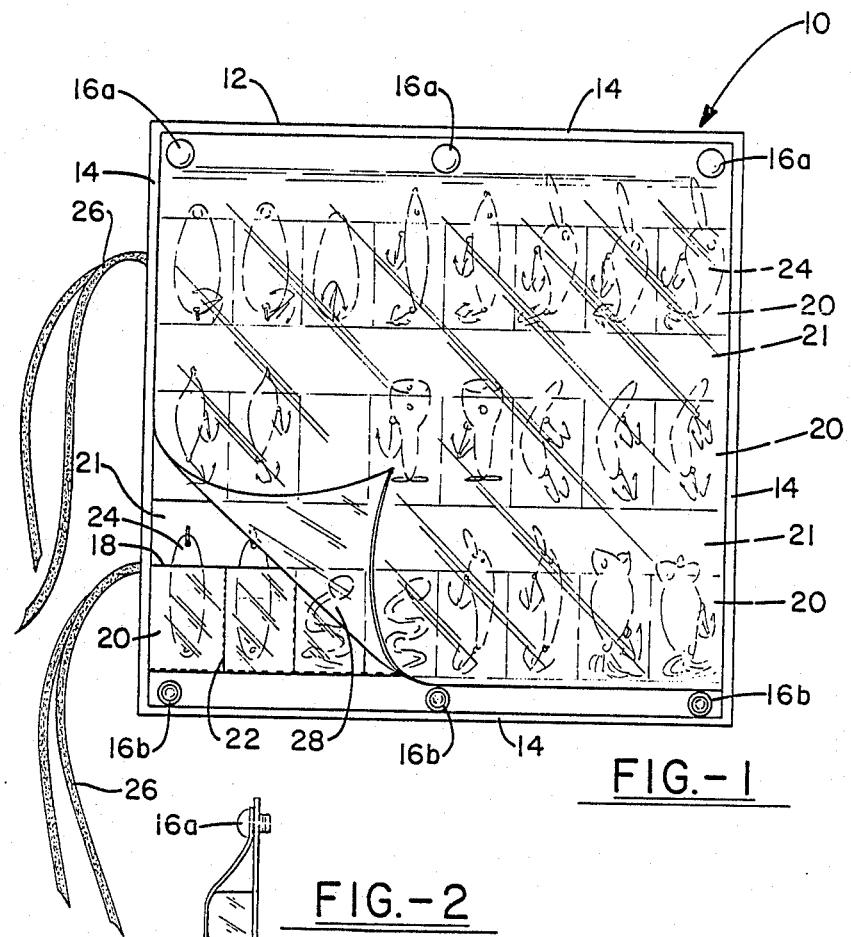
FIG.-1
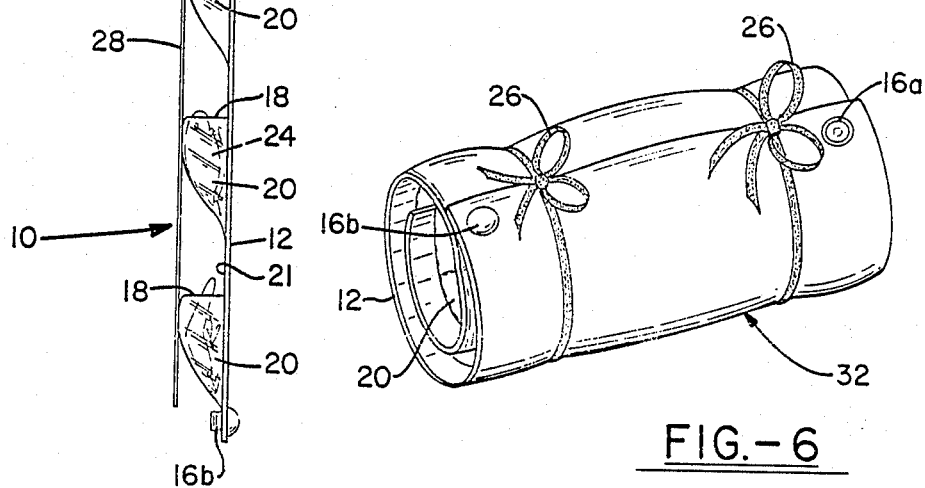
FIG.-2
FIG.-6

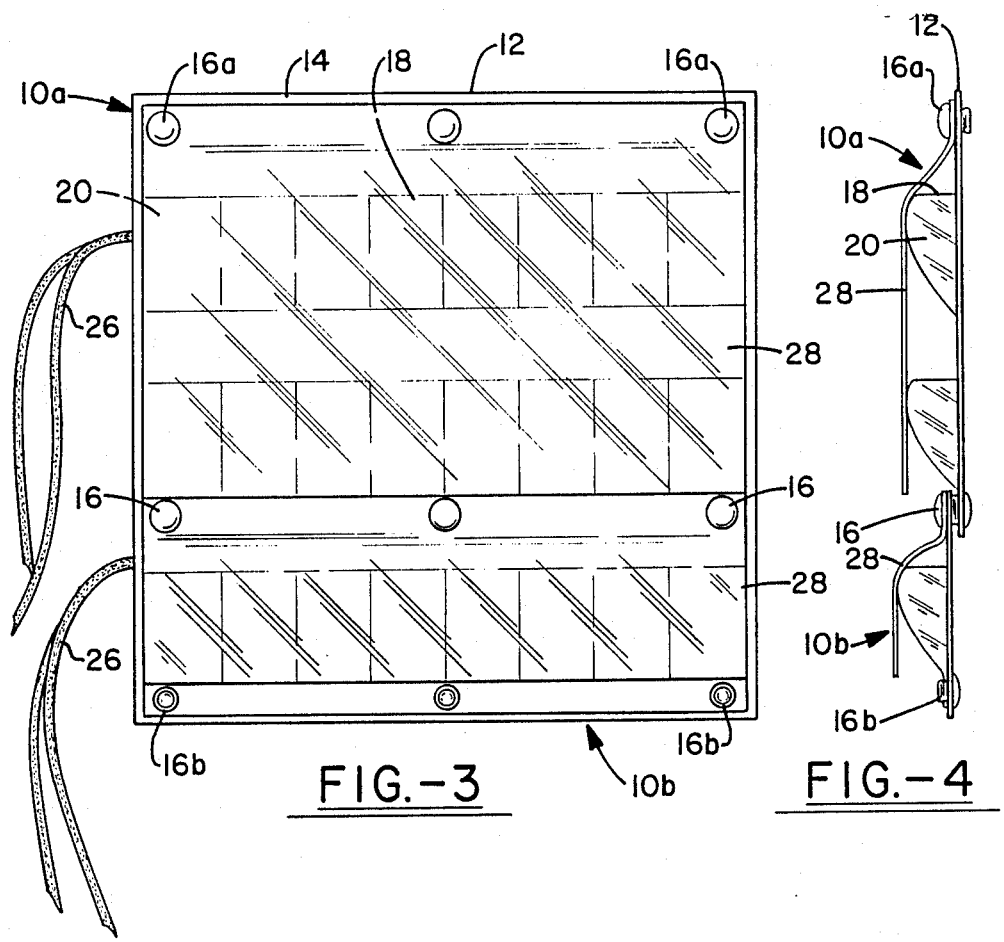
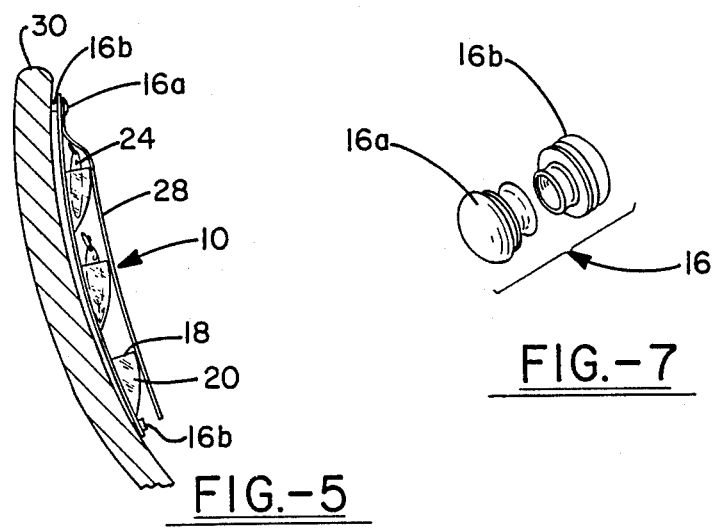

MODULAR FISH LURE HOLDER

TECHNICAL FIELD

This invention relates to a device for holding and storing fish lures and objects related to fishing. More particularly, this invention relates to a fishing lure holder which is provided with a plurality of open-ended, transparent pockets, each of which is adapted to hold a fishing lure, or other object related to sport fishing. Specifically, this invention relates to a modular, flexible fishing lure holder that can be rolled into a cylindrical bundle and tied in that configuration for safe storage. The lure holder modules of the invention are made from a sheet of backing fabric, generally rectangular in shape, having pockets formed from segmented strips of transparent film attached thereto. The modules are provided with a transparent protective cover deployable over the pockets, as well as with fasteners that permit multiple modules to be fastened together and to be temporarily attached to vertical surfaces, for example, to the inner side of a boat.

BACKGROUND OF THE INVENTION

Sport fishing is typically conducted by attaching a bait or lure to the end of a fishing line and deploying it in the water at a location where the fish sought are expected to be. Different fish often respond to different baits, and for reasons not well understood, even the same kind of fish frequently demonstrate different bait preferences, depending upon factors such as the time of day, weather conditions, and other variables. Because of the unpredictability of such preferences, successful fisherman have found it necessary to carry with them lures and baits in a variety of sizes, shapes, colors, and the like. Commonly, these are carried in "tackle" boxes of a type divided into small compartments in which individual lures and other fishing paraphernalia are placed. While fishing accessories of the type described can be stored in tackle boxes, unfortunately, the boxes have a rigid shape and must be opened in a greatly expanded configuration in order to afford access to their contents. For this reason, the boxes can only be placed in a relatively unencumbered, open spaces. This greatly limits their ability to be stored in confined quarters, for example in a boat, where locations that avoid interference with the free movement of the fishermen, while at the same time allowing free access to the tackle in the box, are usually limited. Such tackle boxes also have a tendency to expose the metallic parts of lures carried in them to the corroding influence of water splashed into the box. A further disadvantage is that the materials from which the boxes are made are often metallic, and these are inclined to mar the high luster paints usually found on the surfaces of the lures.

In order to avoid the problems described, "soft-pack" tackle containers have been proposed, for instance, those described in U.S. Pat. No. 4,691,469. The container therein described consists of rows of overlapping compartments fastened to nylon fabric fitted with velcro strips, the latter allowing the containers to be rolled up and secured when not in use. As particularly explained in the patent, the container is designed to be unrolled and placed upon a horizontal surface, for instance the floor of a boat, when access to the contained lures is required. While the container pack of the Patent provides certain advantages over the tackle boxes described, it also exhibits certain serious drawbacks. For example, the capacity of the container is unexpandable, being limited to the number of lures that can be inserted in the pockets provided in the pack. Furthermore, the multi-compartmented pockets taught are both complex and overlapping, making retrievals of the lures from the overlapped pockets awkward and inconvenient. In addition, the necessity of spreading the pack out over a flat surface, at least in the case of the bottom of a boat, frequently results in creating an obstacle which must be avoided, if damage to the lures occurring from stepping on the pack is to be avoided. Also, the velcro strips employed in connection with the pack lose their fastening ability with the passage of time, making the strips less able to hold the pockets in their folded position, and to secure the pack in a rolled configuration.

DISCLOSURE OF THE INVENTION

In view of the preceding, therefore, it is a first aspect of this invention to provide a soft-pack fishing lure holder that is modular in construction and, hence, one that can readily be expanded to hold additional lures. A second aspect of the invention is to provide a modular fishing lure holder that may be temporarily attached to, and suspended from an out-of-the-way vertical surface, such as the side of a boat, providing easy visibility of, and ready access to the lures, baits, and other fishing tackle contained therein.

A further aspect of the invention is furnished by a modular fish lure holder having which allow additional pockets to be attached thereto, the mouths of all the pockets being simultaneously accessible for the insertion or withdrawal of the lures thereinto, or therefrom, once a lure-protecting cover has been folded out of the way.

An additional aspect of the invention is the provision of pocketed fish lure holder modules that may be fastened, and refastened to each other or to vertical surfaces, almost indefinitely by matable fasteners attached to the modules.

Yet another object of the invention is to provide a modular fish lure holder that may be rolled into a soft, flexible, cylindrical bundle for storage, and secured in that configuration by fastening tie straps attached thereto.

The foregoing and other aspects of the invention are provided by a module for a modular fish lure holder comprising:

a rectangular backing sheet;

at least one pocket-containing strip of transparent plastic sheeting;

a transparant, plastic, protective cover sheet;

a plurality of two-component, matable fasteners; and tie straps, wherein said strips are fastened to said backing sheet in non-overlapping, parallel, transverse rows at attachment points located to provide adjacent pockets disposed at right angles to said rows, with the open ends of said pockets facing a first edge of said backing sheets, and wherein a plurality of a first of said fastener components of said two-component matable fasteners are attached along said first edge, while counterpart fastener components are attached along the opposite edge of said backing sheet, and wherein further, said cover sheet, which is adapted for placement over said pockets, is attached at attachment points along said first edge, and wherein still further, said tie straps, which are adapted to encircle said holder when the holder is rolled into a cylindrical bundle, and to be tied to secure said holder in the said shape of said bundle, are attached to said backing sheet.

The foregoing and still other aspects of the invention are provided by a modular fish lure holder in which at least two modules of the type described in the preceding paragraph are fastened together by means of two-component, matable snap fasteners, wherein the first of said fastener components attached to one of said modules, are mated to said counterpart fastener components which are attached to another module.

BRIEF DESCRIPTION OF THE DRAWINGS

The invention will be better understood when reference is had to the following figures, in which like numbers refer to like parts, and wherein:

FIG. 1 shows a plan view of a module of the modular fish holder of the invention.

FIG. 2 is a side elevation of the module of FIG. 1.

FIG. 3 shows a plan view of two modules of the fish holder of the invention, fastened together with two-component, matable snap-fasteners.

FIG. 4 shows a side elevation of the fastened modules of FIG. 3.

FIG. 5 illustrates a module of the invention fastened to the inner side of a boat.

FIG. 6 is rolled lure holder of the invention, fastened in the form of a cylindrical bundle by means of tie straps.

FIG. 7 shows a two-component matable snap-fastener.

DETAILED DESCRIPTION OF THE INVENTION

FIG. 1 shows a plan view of a module, generally 10, of the invention comprising a backing sheet 12 to which pocket-containing transverse strips of transparent plastic sheeting 20 are attached. Bait pockets, generally 18, are formed in the strips 20 by stitching 22, which fastens the strips to the backing sheet 12. The backing sheet 12 has tie straps 26 attached thereto, and it may also have a binding strip 14 fastened to its periphery. The Figure shows a module fitted with one type of two-component, matable fasteners comprising, for example, a female snap fastener component 16a disposed along the top edge, i.e., the edge faced by the open end of the pockets 18, and counterpart snap-fastener components, for example, male components 16b, disposed along the opposite, lower edge of the lure holder module. The pockets shown contain a variety of lures and other fishing paraphernalia 24 therein. The lure holder 10 also includes a protective cover sheet 28, as is more easily seen in FIG. 2.

The backing sheet 12 may be made from a variety of suitable materials including fabrics such as cotton, nylon, polyester, and others, or flexible plastic sheeting such as PVC, polyolefins, or similar materials.

The pocket strips 20, and the protective covering sheet 28, are fashioned from flexible, transparent plastic material such as, for instance, polyethylene, polypropylene, PVC, or similar plastics.

The pocket strips 20 can be attached to the backing sheet 12 by means of stitching, heat welding, adhesives, or in other ways well known in the art. The use of stitching, however, particularly with synthetic threads, results in especially secure attachment, and the formation of durable pockets.

FIG. 2 is a side elevation of a fish holder module 10 showing details of the protective cover sheet 28, attached to the backing sheet 12. The method of attachment may be the same as that described in connection with attachment of the pocket strips 20. FIG. 2 also shows the snap-fastener components 16a, and 16b, as well as lures 24 disposed in the bait pockets 18. While the embodiment of FIGS. 1 and 2 has been described in connection with positioning of female fasteners at the top of the lure holder module, and male fastener components at the bottom edge thereof, the positions of the components may be reversed, if desired.

The weight of the plastic sheeting used to form the protective cover sheet 28, and the pocket strips 20 may vary depending upon considerations such as cost, the types of lures to be stored, and similar considerations; however, the use of plastic sheeting having a gauge of from about 8 to 20 has been found to be very satisfactory. Similarly, the weight of the backing sheet may also vary rather considerably. When the backing sheet 12 is formed from fabric, a fabric made with threads having a denier of from about 400 to 1,000 will be found to be satisfactory, while when plastic sheeting is used a thickness similar to that described in connection with the pocket strips 20 and the protective cover sheet 28 will be adequate.

FIG. 3 shows two modules of the invention generally 10a and 10b, respectively, attached by two-component, matable snap-fasteners, generally 16. Additional fastener components, namely female components 16a, and male fastener components 16b, are also shown attached to the modules. The connection of two or more modules is particularly convenient when there are two few of the pockets 18 located on one module to accommodate the number of lures for which storage space is required. The connected modules shown in the Figure are provided with binding strips 14 to provide a neat appearance, and to protect tearing or ravelling of the edges of the module, while tie straps 26 allow the modules to be secured in a rolled bundle. The pocket strips 20 have been secured to the backing strips of the modules, and pockets 18 formed therein, by means of stitching 22.

The dimensions of the modules may be selected on the basis of convenience, with modules having a width of from about 18 inches to 30 inches being especially easy to handle. The pocket strips 20 will depend upon the size of the paraphernalia to be stored, strips from about 4 to 6 inches being common. The width of the pockets 18 will likewise depend on the anticipated size of their contents; however, a width of from about 2 to 3 inches will usually be preferred.

While pocket strips 20 must not overlap, in order to avoid interference with the insertion and withdrawal of lures, they may substantially abut each other. It is greatly preferred, however, to provide a space 21 between the parallel rows of pocket strips 20, and the provision of such a space of about ½ inch to 1½ inches wide is provided in the preferred embodiment.

While the modules of the invention require the use of at least two of the two-component, matable fasteners, for example, the snap fasteners 16, more of such fasteners may be used, with the employment of three fasteners being particularly desirable.

FIG. 4 shows a side elevation of the connected modules of FIG. 3. The Figure shows lure holder modules 10a and 10b comprising backing sheets 12, protective cover sheets 28, and pockets 18, the modules being connected by male and female snap fasteners components, 16b and 16a, respectively. While two connected modules are shown, more or less than that number may also be employed. The pockets 18 of the modules are particularly adapted for holding so-called "crank baits", but the pockets are also well suited to hold other fishing materials such as hooks, sinkers, swivels, needle-nosed pliers, and other items.

FIG. 5 illustrates a module of the invention 10 attached to the inner side of a boat 30. As illustrated, a male snap-fastener component 16b has been mounted to the side of the boat 30, and a female fastener component 16a has been mated thereto by forcing the female component, which is attached to the lure holder module 10, over the male component. Mounted to a vertical surface in such fashion, the module 10 hangs downward, covered by protective cover 28, which prevents splashed water from entering the pockets 18. The protective cover sheet 28 also helps secure the lures 24 in the pockets 18, as well as protecting fishermen in the boat from accidental contact with lure-hooks which may extend from the pockets. While the lure holder 10 is shown attached to the inner side of the boat 30, the fasteners components can as easily be mounted on a bulkhead, or other vertical surface within the boat.

FIG. 6 shows a lure holder, generally 32, containing lures 24 therein, which is secured in its rolled configuration by tie strips 26. Two tie strips 26 are shown in the Figure; however, the optimum number will depend upon the length of the modular lure holder being secured, with some requiring only one tie strip, while in cases where several modules have been connected together as previously described, more than two tie strips may be desirable.

FIG. 7 shows a two-component, matable snap-fastener 16 comprising a female fastener component 16a, and a male fastener 16b. Snap-fasteners of the type illustrated in the Figure are virtually indestructible, and are especially preferred for purposes of the invention. Other, similar type fasteners may also be used, however.

While in accordance with the patent statutes, a preferred embodiment and best mode has been presented, the scope of the invention is not limited thereto, but rather is measured by the scope of the attached claims.

What is claimed is:

1. A module for a modular fish lure holder comprising:
   a rectangular backing sheet;
   at least one transversely extending pocket containing a strip of transparent plastic sheeting;
   a transparent plastic protective cover sheet; a plurality of two-component, matable fasteners, and
   at least one tie strap,
wherein said strip is fastened to said backing sheet at attachment points located to provide adjacent pockets arranged in a row disposed at right angles to the direction of said strip with the open end of said pockets facing a first edge of said backing sheet, and when more than one strip is present, said strips are fastened to said backing sheet in non-overlapping parallel relationship so that there are no overlapping pockets, and wherein a plurality of a first of said fastener components of said two-component matable fasteners are attached along said first edge, while counterpart fastener components are attached along the opposite edge of said backing sheets, and wherein further, said cover sheet, which is adapted for placement over said pockets, is attached at attachment points along said first edge, and wherein still further, said holder is adapted to be rolled into a circular bundle with said at least one strip on the inside of said backing sheet said at least tie strap, which is adapted to encircle said holder when the holder is rolled into a cylindrical bundle, and to be tied to secure said holder in the shape of said bundle, is attached to said backing sheet.

2. A module for a modular lure holder according to claim 1 having more than one of said parallel strips attached to said backing sheet, said strips being spaced apart from each other.

3. A module for a modular fish lure holder according to claim 2 wherein said backing sheet is made from fabric, and attachment at said attachment points is effected by stitching.

4. A module for a modular fish lure holder according to claim 1 wherein said fasteners are snap-fasteners, and wherein said holder has about three substantially equally spaced first fastener components attached along said first edge, and the same number of counterpart fastener components attached in positions complementary to the positions of said first fastener component along the opposite edge of said backing sheet.

5. A modular fish lure holder in which at least two modules according to claim 1 are fastened together by means of two-component, matable snap-fasteners, wherein the first of said fastener components attached to one of said modules, are mated to said counterpart fastener components which are attached to another of said modules.

6. A module for a modular fish line holder according to claim 1 wherein said protective cover sheet is attached to said backing sheet along said first edge thereof.

* * * * *